Oct. 29, 1929.                M. MAURAN                1,733,421
                            HIGH PRESSURE VALVE
                            Filed May 17, 1926
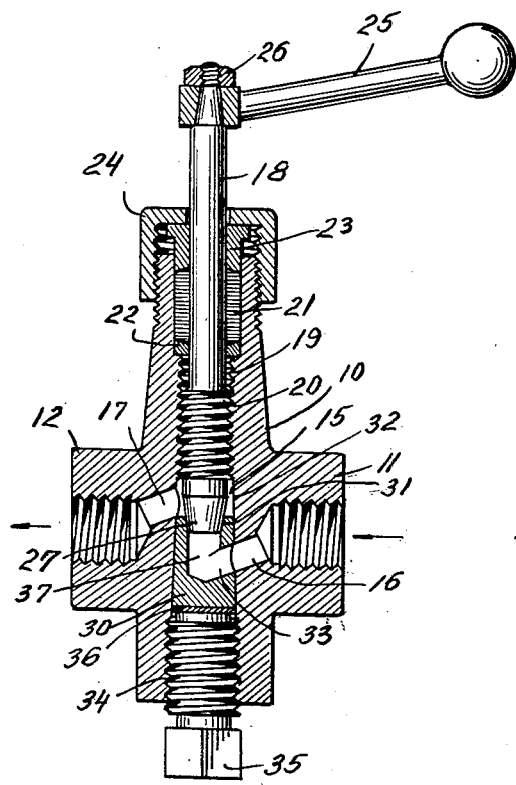
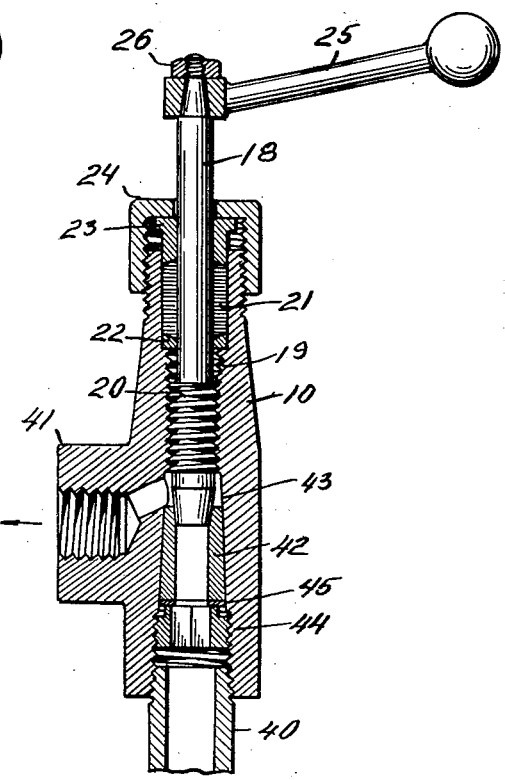
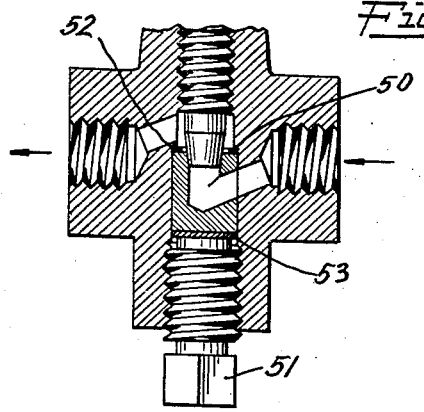
INVENTOR
Max Mauran
BY
Pennie Davis Marvin & Edmonds
ATTORNEYS Patented Oct. 29, 1929

1,733,421

UNITED STATES PATENT OFFICE

MAX MAURAN, OF NIAGARA FALLS, NEW YORK, ASSIGNOR TO THE MATHIESON ALKALI WORKS, INC., OF NEW YORK, N. Y., A CORPORATION OF VIRGINIA

HIGH-PRESSURE VALVE

Application filed May 17, 1926. Serial No. 109,562.

The present invention relates to valves of the type used in pipe lines for conducting fluids and relates more particularly to valves used for controlling the flow of fluids at high pressures. The invention includes valves of the type above referred to and also an improved method of assembling and finishing such valves.

A valve of the type referred to ordinarily consists of a body member provided with an inlet and outlet, a movable member or stem and a seat member. The position of the movable member relative to the seat determines the extent of flow through the valve and the flow is stopped when the movable member is forced against the seat. In operation, the movable member must make an exact contact with the seat in order to close the valve, since otherwise leakage of the fluid through the valve would occur. In valves which are used with ordinary pressures, slight defects in the cooperating members can, in a measure, be overcome by forcing the members together with additional pressure so that a sufficiently tight closure can be obtained. With high pressures, as for instance, 4500 to 5000 pounds per square inch, an exact contact is imperative. Slight wear of the cooperating valve members is damaging and even a small defect in the valve permits much of the fluid to escape. As a result frequent replacement of the valve is required and in order to facilitate such changes, valves have been devised in which the seat members are replaceable.

Valves which have heretofore been devised in which the seat members are replaceable, were constructed so that the seat was removable through the passageway which accommodates the valve stem. In order to replace the seat with such construction the valve bonnet is removed, the stem taken out and the valve seat removed by means of some special tool. The new valve seat is then inserted through the valve stem passageway and moved down until it contacts with a flat surface in the valve body. It has been proposed to force such valve seats into place, and with such construction the valve seat depends upon the valve stem to hold it in place. It has also been proposed to screw such valve seats into place. Valves of both construction are unsatisfactory when used with high pressures. Where the valve seat depends upon the valve stem to hold it in place accurate alignment between the valve seat and the stem and the fluid tight joint between the seat and the valve body are not attained. Moreover difficulty is experienced in removing the worn valve seats from the valve body as the seat must be drawn out through the top of the valve body.

The valve constituting the present invention is arranged so that the seat member may be readily replaced and so that the replacement of the seat may be accomplished at small cost in labor and material. The new valve construction affords an accurate alignment between the valve stem and the valve seat, and the seat is placed within the body in such a way that a fluid tight joint between the seat member and the valve body is assured independently of the action of the valve stem. The valve seat is held within the body of the valve in a manner entirely independent of the valve stem and it is maintained securely in position and in alignment with the valve stem independent of the operation of said stem.

In a valve of the present construction, the seat member is much more easily removed and replaced, as said member may be forced out of one end of the valve body by a tool inserted in the opposite end thereof. Such construction therefore eliminates the necessity of the use of a special tool for loosening the seat member and withdrawing it through the opening in the valve body provided for the valve stem. This construction also lessens the danger of injury to the threads provided in the valve body to cooperate with the threaded portion of the stem.

The new valve includes the customary body with the inlet and outlet openings, and the movable member is in the form of a stem which projects through an opening in the body and is provided with the usual handle. This stem is threaded so that its position in the body may be varied as required in opening and closing the valve. In the body, and in alignment with the stem, is a chamber for receiving the seat member, and there is an opening through which the seat member may be inserted, the opening thereafter being closed by a set screw which holds the seat member firmly in position within the chamber. The seat has a recess which is in alignment with the end of the stem and is entered by the stem when the latter is moved into the closed position. There is an opening in the seat member in communication with the inlet opening in the body of the valve, so arranged that when the valve is closed the pressure of the confined fluid is exerted against the end of the stem.

With this arrangement, when the seat needs replacement, the stem is removed, the set screw is unscrewed from the valve body, and then a tool, inserted through the stem opening, is used to force the seat member out of the valve body. A new seat is now put in position and another tool may be employed to grind the surface of the seat member against which the end of the stem contacts, so as to secure an exact fit between the stem and the seat. Also, at this time the opening through which the fluid passes from the inlet into the body of the seat member may likewise be formed or enlarged so as to secure an uninterrupted travel of the fluid from the inlet to the interior of the seat member.

The new valve is capable of withstanding extremely high pressures and owing to the exact fit secured between the seat and the end of the stem and between the seat member and the walls of the chamber leakage is prevented. Also the valve has a much longer life by reason of the fact that the opening in the seat member and the end of the stem are in exact alignment. The valve may be made with the inlet and outlet in alignment with each other, or, if desired, the inlet and outlet may be arranged at any desired angle. For example, the inlet may extend in a direction parallel to the axis of the stem, with the outlet at a right angle thereto.

For a better understanding of the invention, reference will be made to the accompanying drawings wherein—

Fig. 1 is a sectional view of a valve having the inlet and outlet in alignment with each other;

Fig. 2 is a sectional view of an angle valve, and

Fig. 3 is a fragmentary view of a modified form of Fig. 1.

Referring to the drawings the valve structure shown in Fig. 1 consists of a body portion 10 which is provided with internally threaded projections 11 and 12 adapted to receive inlet and outlet pipes, respectively. Extending through the body of the valve, transversely to the pipe connections, is a passageway or chamber 15. The inlet and outlet pipe connections are in communication with this passageway by ports 16 and 17. A valve stem 18 is mounted in one end of this passageway, the walls of the passageway being threaded as shown at 19 for receiving the threads 20 of the valve stem. Positioned above the threaded portion of the valve stem is suitable packing material 21 and this packing material is situated between a washer 22 and a packing gland 23. This packing is held in place by the packing nut 24. The outermost end of the valve stem is provided with a movable handle 25 which is held in place by the nut 26. The innnermost end of the stem is of frusto-conical shape as indicated at 27 and this end of the stem is preferably of polished and hardened material.

Within the passageway 15 is a valve seat member 30 which is preferably of relatively soft material, such as Monel metal and which provides a conical seat 31 for cooperating with the conical end 27 of the valve stem. This valve seat member may be of frusto-conical shape and as shown in Figs. 1 and 2 fitted within a similarly shaped chamber formed by the slanting walls 32 of the passageway. This valve seat member has a bore 33 which communicates with the inlet port 16 and with a recess 37 which lies below the seat 31. The walls of the passageway 15 are screw threaded as shown at 34 and a set screw 35 forces the valve seat member into place and holds it against displacement. An anti-friction disk 36 is placed between the set screw and the valve seat member and this friction disk may be of any suitable material as, for instance, steel or copper.

When the valve seat member becomes worn or defective so that a tight closure cannot be effected, this member can be removed from the valve structure and a new valve seat member inserted in its place. In order to remove the member the packing nut 24 and the valve stem 18 are removed and the set screw 35 is taken out. A suitable tool is then inserted into the valve stem end of the passageway and the seat member is driven out. A new member is then inserted in the naked body of the valve and it is forced tightly against the slanting walls of the passageway by the set screw 35 so as to effect a fluid-tight connection. The anti-friction disk which lies between the set screw and the seat member allows turning the set screw without causing a turning of the seat member. The new seat member may be in the form of a solid plug of material when it is inserted, and the bore 33 and the recess 37 may be placed therein by suitable drilling tools after the member is in position. It is preferable, however, that the new seat member be provided with the recess 37 before it is placed within the body, and after it is securely held in position by the set screw, the bore 33 is drilled through the material and the opening of the recess 37 may be reamed out if necessary. This assures an accurate alignment between the bore and the inlet port 16 and an accurate seat for the valve stem. The valve stem is now placed in position and the change is completed.

The valve structure shown in Fig. 2 is of the angle type. In this type of valve the inlet pipe is connected thereto as shown at 40 and the valve includes an internally threaded portion 41 for receiving an outlet pipe. The stem structure of this valve is the same as the valve stem structure of the valve shown in Fig. 1. The valve seat member 42 is of tubular formation and, similar to Fig. 1, may be of frusto-conical shape so as to fit tightly against the slanting walls 43 of the passageway. This valve seat member is held in place by the set screw 44 which has an aperture extending therethrough so as to permit flow of fluid through the pipe 40 and into the tubular seat member. This aperture is square or of any other suitable shape to receive a tool for turning the set screw. An anti-friction washer 45 is placed between the set screw and the seat member to permit relative movement between the set screw and the seat member when the set screw is being turned.

For removal of the seat member of the structure shown in Fig. 2 the valve stem is removed and the inlet pipe 40 is removed. A suitable tool is then inserted into the aperture of the set screw 44 and this set screw is removed. The member 42 is then driven out by a tool inserted into the valve stem end of the passageway. A new seat member is then inserted and forced into position by the set screw whereupon the valve stem and the inlet pipe are again placed in position and the change is completed.

In the modification shown in Fig. 3, that section of the passageway 15 which receives the seat member is provided with parallel walls and is adapted to receive a seat member with parallel sides instead of the tapered seat member shown in Figs. 1 and 2. The walls of the upper part of this chamber are so shaped as to provide a shoulder 50 against which shoulder the seat member is forced by the set screw 51. A washer 52 of suitable material, such as copper, may be placed between the shoulder and the seat member and an anti-friction disk 53, such as described above may be inserted between the seat member and the set screw 51. The seat member of this form is replaced in the same manner as the form shown in Fig. 1. In putting in a new seat member the set screw is tightened to force the seat member against the shoulder and thus secures a fluid-tight contact between the seat member and the valve body. The seat member fits closely against the walls of the chamber and is held in accurate alignment with the valve stem. The modification shown in Fig. 3 is equally applicable to the angle type of valve shown in Fig. 2.

I claim:

1. A valve for high pressure use which comprises a body having a chamber therein and a pair of ports through the wall of the body, a screw stem movably mounted in an opening in the body with an integral valve cone entering the chamber, a seat member of tapering section lying in the body in front of the stem with its outer wall engaging a conical surface of the chamber preventing contact of the fluid with the wall of the chamber below the level of the valve seat, this seat member terminating at its front end in a seat for the cone, a passageway in the member leading to the seat, an opening in the seat member connecting the passageway with one of the ports, and a plug threaded into the wall of the body and entering the said chamber, this plug bearing against the rear end of the member to force the latter against the conical surface.

2. A valve for high pressure use, which comprises a body having a chamber and a pair of ports in the wall of the body, a stem mounted movably in an opening in the body with one end entering the chamber, a seat member of tapering section lying in the body in front of the stem with its outer wall engaging a conical surface within the body, this seat member terminating at its front end in a seat for the end of the stem, the seat and the end of the stem with which it cooperates being of less diameter than the opening in which the stem is mounted, a passageway in the seat member leading away from the seat, an opening in the seat member connecting this passageway with one of the ports, the opening lying in registry with the said port whereby the opening may be formed in the member after the latter is placed in position within the body, and a plug threaded in the wall of the chamber at the rear of the seat member and bearing against the rear end of the latter, this plug affording means for forcing the seat member into contact with the conical surface of the chamber.

3. A valve for high pressure use, which comprises a body having a chamber therein, an inlet and an outlet port in the body, an opening in the body communicating with the chamber, a screw stem movably mounted in the opening and having an integral valve cone extending into the chamber a seat member disposed within the chamber in contact with the wall thereof and in front of the cone, this member having the end in opposition to the cone provided with a seat with which the stem cooperates, a passage extending into the seat member away from said seat, a plug threaded into the wall of the chamber and bearing against the end of the seat member to force it into position, and an opening in the wall of the seat member connecting the passage therein with one of the ports, this opening lying with its axis in registry with that of the said port whereby the opening may be formed after the seat member has been placed in position.

4. A valve for high pressure use, comprising a body having a chamber formed therein and a pair of ports in the wall of the body, one of these ports directly communicating with the chamber, the wall of the chamber at one side of the port providing a seat, the other of these ports opening into said seat, a seat member disposed within the chamber with its outer wall in contact with said seat, a screw stem movably mounted in an opening in the wall of the body with an integral valve cone projecting into the chamber, the cone lying in opposition to the seat member and the latter being provided with a seat at one end with which said cone cooperates, a passage in the seat member leading to the seat formed therein, an opening in the wall of the seat member connecting this passage with said second port, and a plug threaded into the wall of the body and adapted to force the seat member into contact with the seat therefor formed in the wall of the chamber.

5. A valve for high pressure use, comprising a body having a chamber, a port in the wall of the body in communication with this chamber, an opening in the body leading to the chamber, a screw stem movably mounted in the opening and having an integral valve cone, a seat member disposed in the chamber in opposition to said cone and terminating in a seat with which the cone cooperates, this seat lying at one side of the said port, a passage in the seat member leading from the seat therein, a second port through the wall of the body, the said member contacting with the wall of the body over a substantial area in every direction from said second port, an opening in the seat member connecting the passage therein with the said second port, and a plug threaded into the wall of the body and closing the end of the chamber, this plug bearing against the end of the seat member and being adapted to hold the latter in position against the wall of the chamber, that part of the chamber closed by the plug being of sufficient diameter to permit the removal of the seat member therethrough.

6. A valve for high pressure use, which comprises a body having a chamber therein, a portion of the wall of said chamber being tapered, a port in the wall of the body communicating with the said chamber, an opening in the wall of the body having a screw stem movably mounted therein, this stem having an integral valve cone entering the chamber, a seat member of tapering section having its outer wall contacting with the tapering wall of the chamber, thus preventing contact of the fluid with the wall of the chamber below the level of the valve seat, this seat member lying in the chamber beyond the cone and terminating in a seat with which the cone cooperates, a passage in the seat member leading away from the seat, a second port in the wall of the body, an opening in the seat member connecting the passage therein with the said second port, and a plug threaded into the body and closing one end of the chamber, this plug bearing against the end of the seat member and being adapted to force the latter into contact with the tapering wall of the chamber, the diameter of the threaded portion of the chamber in which the plug is mounted being of sufficient size to permit the removal of the seat member therethrough.

7. A valve for high pressure use which comprises a body having a chamber therein and a pair of ports through the wall of the body, a portion of said chamber tapering from the rear to the front, a tapered seat member fitting tight into the tapering portion of said chamber, said seat member having a passageway therethrough opening into a conical port in the front of the said seat member, said passageway constituting the only open connection between the said conical port and one of the ports in the body, a plug threaded into the wall of the body and bearing against the rear of the seat member to hold it in place against the body, a threaded stem with a tapered seat and a threaded opening in the body, said stem being movable in said threaded opening to twist its tapered seat into the conical port in the top of the seat member.

8. A valve for high pressure use which comprises a body having a chamber therein and a pair of ports through the wall of the body, a portion of said chamber tapering from the rear to the front, a tapered seat member fitting tight into the tapering portion of said chamber, said seat member having a passageway therethrough opening into the front of the said seat member, said passageway constituting the only open connection between one of the said ports and the front portion of said chamber, a plug threaded into the wall of the body and bearing against the rear of the seat member to hold it in place against the body, a threaded opening in the body, and a threaded stem movable in said threaded opening to close tight over the opening in the seat member by twisting tightly against it.

9. A process of assembling and finishing a high pressure valve designed for insertion of a removable seat from the rear, which comprises inserting the removable seat in the naked body of the valve, holding the seat in place by pressure from the rear, machining the exposed front of the seat, and then putting the valve stem in place.

10. A process of assembling and finishing a high pressure valve with two ports in the body designed for insertion of a removable seat from the rear, which comprises recessing the front face of the removable seat and inserting said removable seat in the body of the valve so as to cover one of the ports, holding the seat in place by pressure from the rear, and thereafter drilling a hole through said port to connect with the recess in the removable seat.

11. A process of assembling and finishing a high pressure valve designed for insertion of a removable seat from the rear, which comprises inserting the said removable seat in the naked body of the valve so as to cover one of the ports, holding the seat in place by pressure from the rear, and recessing the front face of the removable seat, thereafter drilling a hole through said port to connect with the recess in the removable seat, machining the exposed front of the seat, and putting the valve stem in place.

In testimony whereof I affix my signature.

MAX MAURAN.